United States Patent
Oral et al.

(10) Patent No.: US 7,769,039 B2
(45) Date of Patent: Aug. 3, 2010

(54) SYSTEM CONFIGURED FOR COMPLEX DETERMINATION OF A USER'S BUSY STATE AND FOR ASSIGNING AN ORGANIC "DO NOT DISTURB" FILTER

(75) Inventors: Tolga Oral, Winchester, MA (US); Thomas Schaeck, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 947 days.

(21) Appl. No.: 11/538,866

(22) Filed: Oct. 5, 2006

(65) Prior Publication Data
US 2008/0084894 A1 Apr. 10, 2008

(51) Int. Cl.
*H04M 3/42* (2006.01)
*H04L 12/42* (2006.01)
(52) U.S. Cl. ............... 370/429; 370/450; 455/414.1; 455/414.3; 455/567; 379/201.01; 379/201.02; 379/207.02
(58) Field of Classification Search ........... 370/230, 370/450, 429, 401; 455/216, 414.1–414.3, 455/567; 709/203, 230, 227; 379/157, 201.1, 379/201.2, 201.3, 207.2
See application file for complete search history.

(56) References Cited

U.S. PATENT DOCUMENTS

| | | | | |
|---|---|---|---|---|
| 4,278,844 A | * | 7/1981 | Jones | 379/157 |
| 5,822,418 A | * | 10/1998 | Yacenda et al. | 379/201.07 |
| 6,009,469 A | * | 12/1999 | Mattaway et al. | 709/227 |
| 6,185,184 B1 | * | 2/2001 | Mattaway et al. | 370/230 |
| 6,324,410 B1 | * | 11/2001 | Giacopelli et al. | 455/554.1 |
| 6,408,060 B2 | * | 6/2002 | Tanaka et al. | 379/162 |
| 6,535,730 B1 | * | 3/2003 | Chow et al. | 455/416 |
| 6,633,631 B2 | | 10/2003 | Tanaka et al. | |
| 6,636,741 B2 | * | 10/2003 | Yoshioka et al. | 455/404.2 |
| 6,798,874 B1 | | 9/2004 | Ohlinger et al. | |
| 7,076,275 B1 | * | 7/2006 | Karstens et al. | 455/567 |
| 7,660,405 B2 | * | 2/2010 | Jain et al. | 379/209.01 |
| 2005/0020249 A1 | * | 1/2005 | Seo | 455/414.1 |
| 2005/0037741 A1 | * | 2/2005 | Gilbert | 455/414.1 |
| 2005/0192039 A1 | | 9/2005 | Xue et al. | |

* cited by examiner

*Primary Examiner*—William Trost, IV
*Assistant Examiner*—Emmanuel Maglo
(74) *Attorney, Agent, or Firm*—Cantor Colburn LLP; Raymond Szeto

(57) ABSTRACT

A system and method for complex determination of a user's busy state and for assigning a do not disturb (DND) filter. A first electronic device is configured to house a DND recognizer module. The first electronic device is further configured to store and execute a plurality of applications. A second electronic device operably associated with the first electronic device. The second electronic device having another DND recognizer module, a DND filter module, and a DND propagator module. The DND filter module is configured to determine whether a particular DND filter is associated with the current busy state of the user and to adjust the DND status provided a DND filter does exist. The DND propagator configured to propagate the DND status to all at least one device operably associated with the system provided a DND status exists for the current busy state of the user.

10 Claims, 2 Drawing Sheets

SYSTEM CONFIGURED FOR COMPLEX DETERMINATION OF A USER'S BUSY STATE AND FOR ASSIGNING AN ORGANIC "DO NOT DISTURB" FILTER

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of Invention

This invention relates in general to computers, and more particularly, to a system for automatically recognizing a user's busy state and assigning a do not disturb filter.

2. Description of Background

Today, many users at home or work are on-line with many collaboration tools and devices where other people can contact them. These collaboration tools/devices can be synchronous such as instant messaging, telephone, cellular, VoIP phone, intercom, etc. Alternatively, these collaboration tools/devices may be a synchronous such as e-mail, voicemail indicator, notifications from any other collaboration application. Not all but some of these collaboration tools and devices provide features for native support of do not disturb (DND) switches. As it is defined today the DND feature is a state defined by the tool/device user to ignore and block any incoming communication.

There are inherent problems with the DND feature, as it exists today. Such problems include, (1) the user has to turn the DND feature on manually. This generally does not occur prior to the first interruption while the user is busy. Secondly, (2) DND is typically a static list identifying when a user can or cannot be contacted. There is no organic DND list that grows or shrinks intelligently. Thirdly, (3) DND has only two stages, which are on or off. There is no definition for level of DND. Last, (4) multiple tools and devices are not connected to the same DND switch so the user has to specifically remember to turn the DND on for all of the tools and devices separately.

Thus, there is a need for a system for automatically recognizing a user's busy state and assigning a DND filter.

SUMMARY OF THE INVENTION

The shortcomings of the prior art are overcome and additional advantages are provided through the provision of a system configured for complex determination of a user's busy state and for assigning a do not disturb (DND) filter. The system includes a first electronic device configured to house a DND recognizer module and further configured to store and execute a plurality of applications operable on the first electronic device. The system further includes a second electronic device operably associated via a network with the first electronic device. The second electronic device implementing another DND recognizer module, a DND filter module, and a DND propagator module. The DND recognizer module housed inside the first electronic device is configured to analyze and determine the user's actions. The DND recognizer module transmits the determined user's action data to the DND filter module. The DND filter module is configured to determine whether a particular DND filter is associated with the current busy state of the user and to adjust the DND status provided a DND filter does exist, such busy state being based upon the user's action data. The DND filter module transmits the DND filter data to the DND propagator housed in the second electronic device. The DND propagator module is configured to propagate the DND status at least one tool operably associated with the system provided a DND status exists for the current busy state of the user.

The shortcomings of the prior art are overcome and additional advantages are provided through the provision of a method for complex determination of a user's busy state and for assigning a do not disturb (DND) filter. The method includes executing an application. Subsequently, the method includes transmitting a user's action data. Then the method proceeds with determining whether a particular DND filter is associated with the current busy state of the user and adjusting the DND status provided a DND filter does exist, such busy state being based upon the user's action data, the DND filter module transmits the DND filter data to a DND propagator. The method concludes with propagating the DND status to at least one tool operably associated with the system provided a DND status exists for the current busy state of the user.

Additional features and advantages are realized through the techniques of the present invention. Other embodiments and aspects of the invention are described in detail herein and are considered a part of the claimed invention. For a better understanding of the invention with advantages and features, refer to the description and to the drawing.

Technical Effects

As a result of the summarized invention, technically we have achieved a solution for a system and a method for complex determination of a user's busy state and for assigning a do not disturb (DND) filter.

BRIEF DESCRIPTION OF THE DRAWINGS

The subject regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
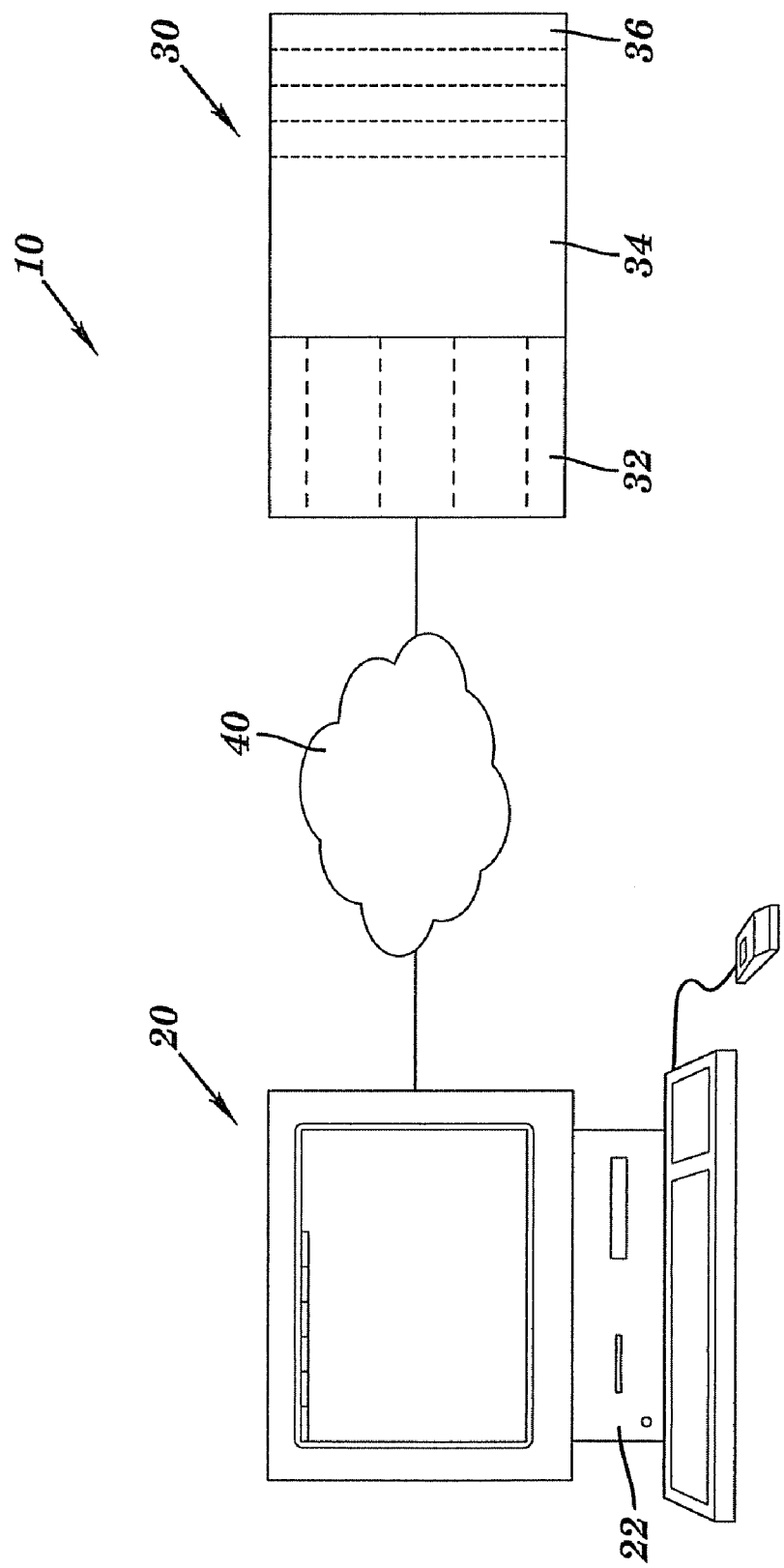
FIG. 1 illustrates one example of a system configured for complex determination of a user's busy state and for assigning a do not disturb (DND) filter.

Referring to FIG. 1, a system 10 configured for complex determination of a user's busy state and for assigning a do not disturb (DND) filter, is shown. The system 10 includes a first electronic device 20 configured to house a DND recognizer module 120. The first electronic device is further configured to store and execute a plurality of applications 22, which are operable on the first electronic device 20. The plurality of application 22 and the user'actions in such applications 22 have assigned particular levels of DND. These defined levels of DND activation depend on how busy the user is at the time of assessment. With every DND level, for example, working, busy, very busy, extremely busy, etc., there is an associated filter definition. The DND filter definition may be capable of defining pass through and block entities as well as supporting wild cards such as block all except pass through. DND filters may define rules where incoming communications (e.g., calls, emails, instant messages) satisfying the rule may be blocked or passed through. DND filters would have static defined entities by the business or user in addition to organically growing entries changing with usage. This system 10 also provides centralized control for DND features across other devices 42 by providing feature stage mappings. As such, if a user's DND is turned on, all linked devices 42 would behave appropriately.

The system 10 further includes a second electronic device 30, which is operably associated via a network 40 with the first electronic device 20. The second electronic device 30 includes another DND recognizer module 32, a DND filter module 34, a DND propagator module 36, which are housed inside the second electronic device 30. The second electronic device 30 may be a server executing computer program code to perform the functions described herein. For example, device 30 may be communications server handling email/instant messaging for device 20 on a LAN.

Certain levels of DND (levels of busy state) are assigned to the applications 22 and user's actions in such applications 22. For example, if a desk side support agent gets a customer support call, the system 10 turns on DND with the appropriate level. An alternative example may include an insurance claim agent working on a claim from their desktop application, depending on the claim type and urgency the DND system 10 might turn on and assign the appropriate level. If the agent gets a call from the customer on the claim he/she is working on; the call might get through while the filter blocks all other calls.

Another way of defining the user's busy state includes integration into collaboration devices 42 such as calendar events. The busy state associated with a particular application 22 and the user's actions in such applications 22 may be set by the user via the user's calendar event scheduler. For example while a user is creating a calendar event for patent review meeting he can define his/her busy state as very busy or whatever the indications are in the software. For the time that user has this meeting his DND level gets automatically assigned to his defined level. In addition, an assigned busy state calendaring tool may be integrated with the system to define an add-on filter for the calendar event defined. For example, the user is expecting a very important message from his co-worker, which would have been blocked by the regular filter assigned to set DND level. The user can create an add-on filter to put an exception on the co-workers name so he/she may be contacted by him/her. The DND recognizer module 32 transmits the determined user's action data to the DND filter module 34 housed within the second electronic device 30.

The DND filter module 34 is configured to determine whether a particular DND filter is associated with the current busy state of the user and to adjust the DND status provided a DND filter does exist, such busy state being based upon the user's action data. The DND filter module 34 transmits the DND filter data to the DND propagator 36 housed within the second electronic device 30. The DND filter module 34 is responsible for defining and resolving the correct filter for a given DND level. Filters can be defined as rules, for example, filter A blocks all incoming communications except for group A where group A could be defined as a group of people or automated messaging entities (like a system notice). One DND level can correspond to multiple filters. For a call/interruption to pass through this certain DND level, all filters would have to be satisfied. Filters may or may not have inheritance, for example, DND level very busy could inherit all the filters from busy (lower DND/busy states). Filters could be assigned to a user's organizational role and his relative role to others. For example, the user filter definition may assert, "accept interruptions only from my upper management chain." Furthermore, applications 22 may put variables into filters such as "accept interruptions only from people listed as contacts in this claim," etc.

The DND propagator module 36 is configured to propagate the DND status to at least one device 42 operably associated with the system 10 provided a DND status exists for the current busy state of the user.

Figure 2:
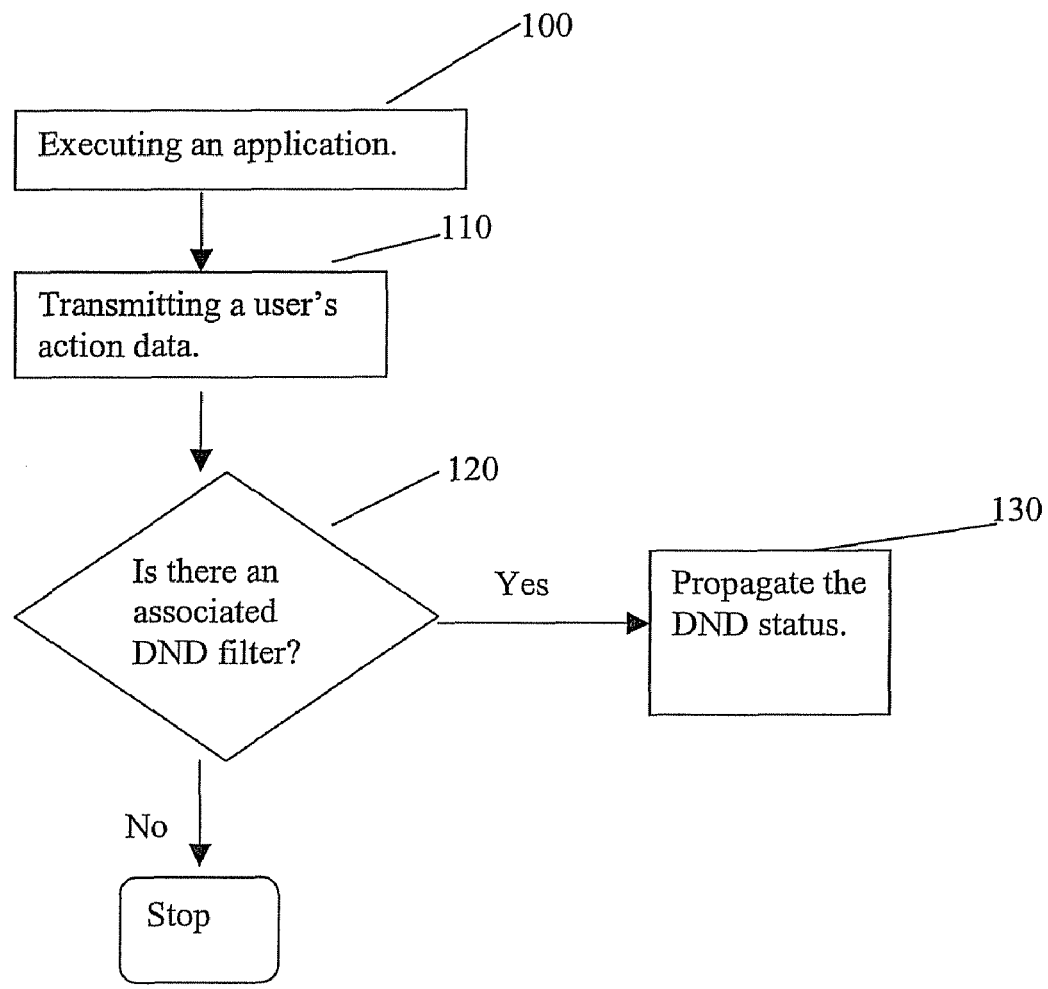
FIG. 2 illustrates one example of a method for complex determination of a user's busy state and for assigning a do not disturb (DND) filter The detailed description explains an exemplary embodiment of the invention, together with advantages and features, by way of example with reference to the drawings.

Referring to FIG. 2, a method for complex determination of a user's busy state for assigning a do not disturb (DND) filter, is shown. At the starting step 100, an application is executed. The applications and the user's actions in such applications have assigned particular levels of DND. The busy state associated with a particular application and the user's actions in such applications are settable by the user via the user's calendar event scheduler.

Subsequently, at step 110, a user's action data is transmitted. Then at step 120, the determination is made whether a particular DND filter is associated with the current busy stat of the user. Then the DND status is adjusted provided a DND filter does exist, such busy state being based upon the user's action data. As previously asserted, the DND filter module transmits the DND filter data to the DND propagator.

Concluding at step 130, the DND status is propagated to at least one tool that is operably associated with the system provided a DND status exists for the current busy state of the user.

Referring to FIGS. 1 and 2, the system 10 and method disclosed are adaptable and usable in various ways. For example, when a user receives an incoming call, the DND filter module 34 checks to verify that the incoming call may be passed through the currently invoked set filter. If the check yields that the call may be passed through, the incoming call is subsequently passed on to the user and the set DND filter is bypassed. Alternatively, if the check yields that the call may not be passed through the currently invoked set filter, the user will not be notified of the incoming call.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system configured for complex determination of a user's busy state and for assigning a do not disturb (DND) filter, comprising:
   a first electronic device configured to house a DND recognizer module and further configured to store and execute a plurality of applications operable on the first electronic device;
   a second electronic device operably associated via a network with the first electronic device, the second electronic device implementing another DND recognizer module, a DND filter module, and a DND propagator module;
   wherein the DND recognizer module housed within the first electronic device is configured to analyze and determine the user's actions in an application executed on the first electronic device, the DND recognizer module is further configured to transmit the determined user's action data in real time, the user's action data representing the user's activity within the application, and the user's action data transmitted to the DND filter module also housed within the second electronic device;

wherein the DND filter module is configured to determine whether a particular DND filter is associated with the current busy state of the user and to adjust the DND status provided a DND filter does exist, such busy state selected from a plurality of busy states each of which is configured to represent which communications are to be filtered, the busy state being based automatically upon the user's current action data, the DND filter module transmits the DND filter data to the DND propagator housed within the second electronic device;

wherein the DND propagator module is configured to propagate the DND status to at least one device operably associated with the system provided a DND status exists for the current busy state of the user; and wherein the DND filter module is configurable by a user to automatically allow incoming communications for one or more users based on the DND filter and to automatically block all other incoming communications.

2. The system of claim 1, wherein the plurality of applications and the user's actions in such applications have assigned particular levels of DND.

3. The system of claim 2, wherein the busy state associated with a particular application and the user's actions in such applications are set by the user via the user's calendar event scheduler.

4. A method for complex determination of a user's busy state and for assigning a do not disturb (DND) filter, comprising:

executing an application;

transmitting a user's action data in real time, the user's action data representing the user's activity within the application;

determining, based on the transmitting, whether a particular DND filter is associated with the current busy state of the user and adjusting the DND status provided a DND filter does exist, such busy state selected from a plurality of busy states each of which is configured to represent which communications are to be filtered, the busy state being automatically based upon the user's current action data, the DND filter module transmits the DND filter data to the DND propagator;

propagating the DND status to at least one tool operably associated with the system provided a DND status exists for the current busy state of the user; and wherein the DND filter module is configurable by a user to automatically allow incoming communications for one or more users based on the DND filter and to automatically block all other incoming communications.

5. The method of claim 4, wherein the plurality of applications and the user's actions in such applications have assigned particular levels of DND.

6. The method of claim 5, wherein the busy state associated with a particular application and the user's actions in such applications are set by the user via the user's calendar event scheduler.

7. The system of claim 1, wherein the busy state is based on an appointment in a calendar application, the busy state set by the user at the time that the appointment is created, and the busy state activated when the appointment comes due.

8. The method of claim 4, wherein the busy state is based on an appointment in a calendar application, the busy state set by the user at the time that the appointment is created, and the busy state activated when the appointment comes due.

9. The system of claim 1, wherein the DND filters form a hierarchy of filters, and higher level filters inherit the attributes of lower level filters.

10. The method of claim 4, wherein the DND filters form a hierarchy of filters, and higher level filters inherit the attributes of lower level filters.

* * * * *